July 2, 1968  A. B. MOJONNIER ET AL  3,391,045
METHOD FOR JOINING THERMOPLASTIC BODIES
Filed Sept. 9, 1964  4 Sheets-Sheet 1

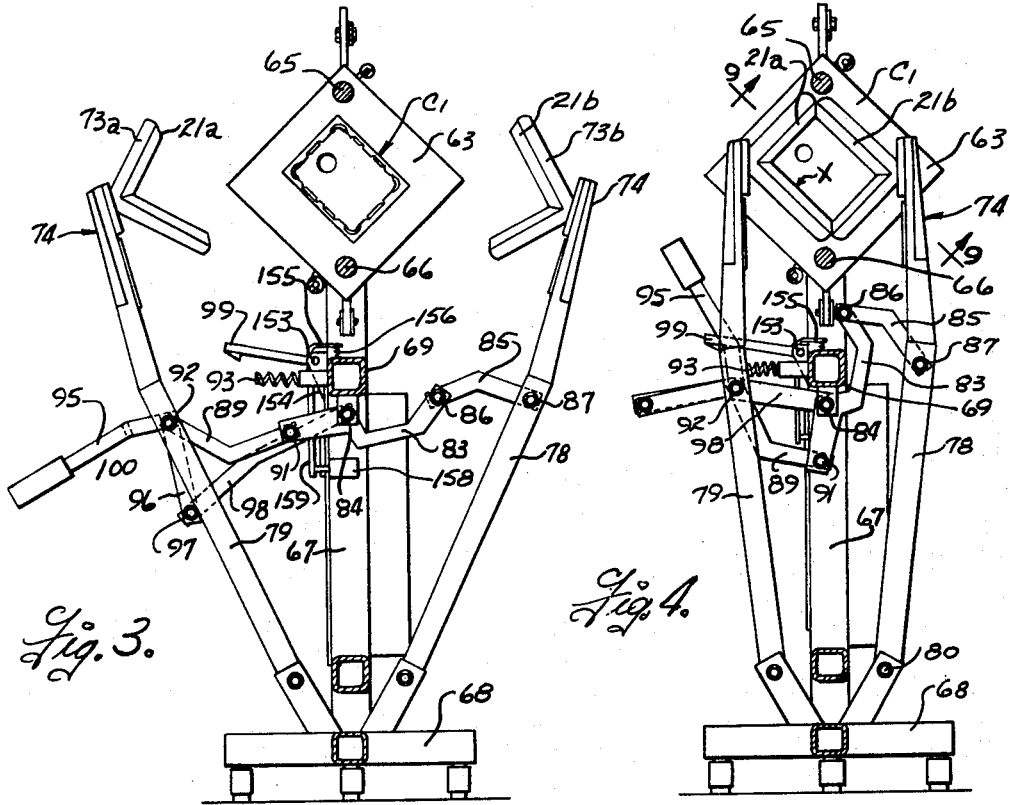
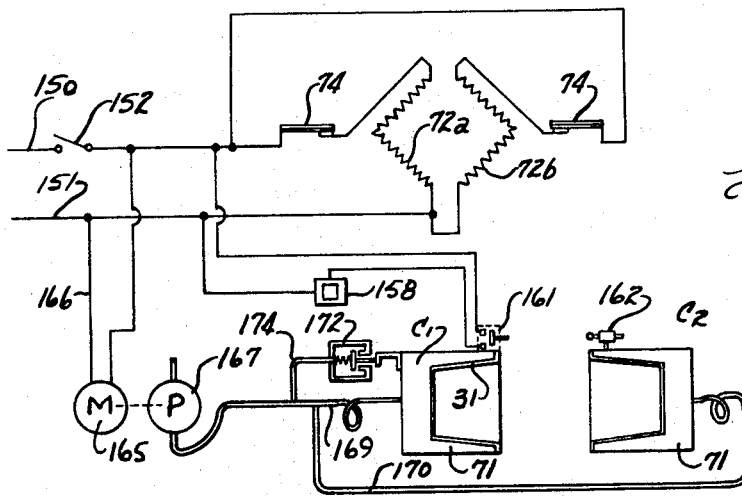

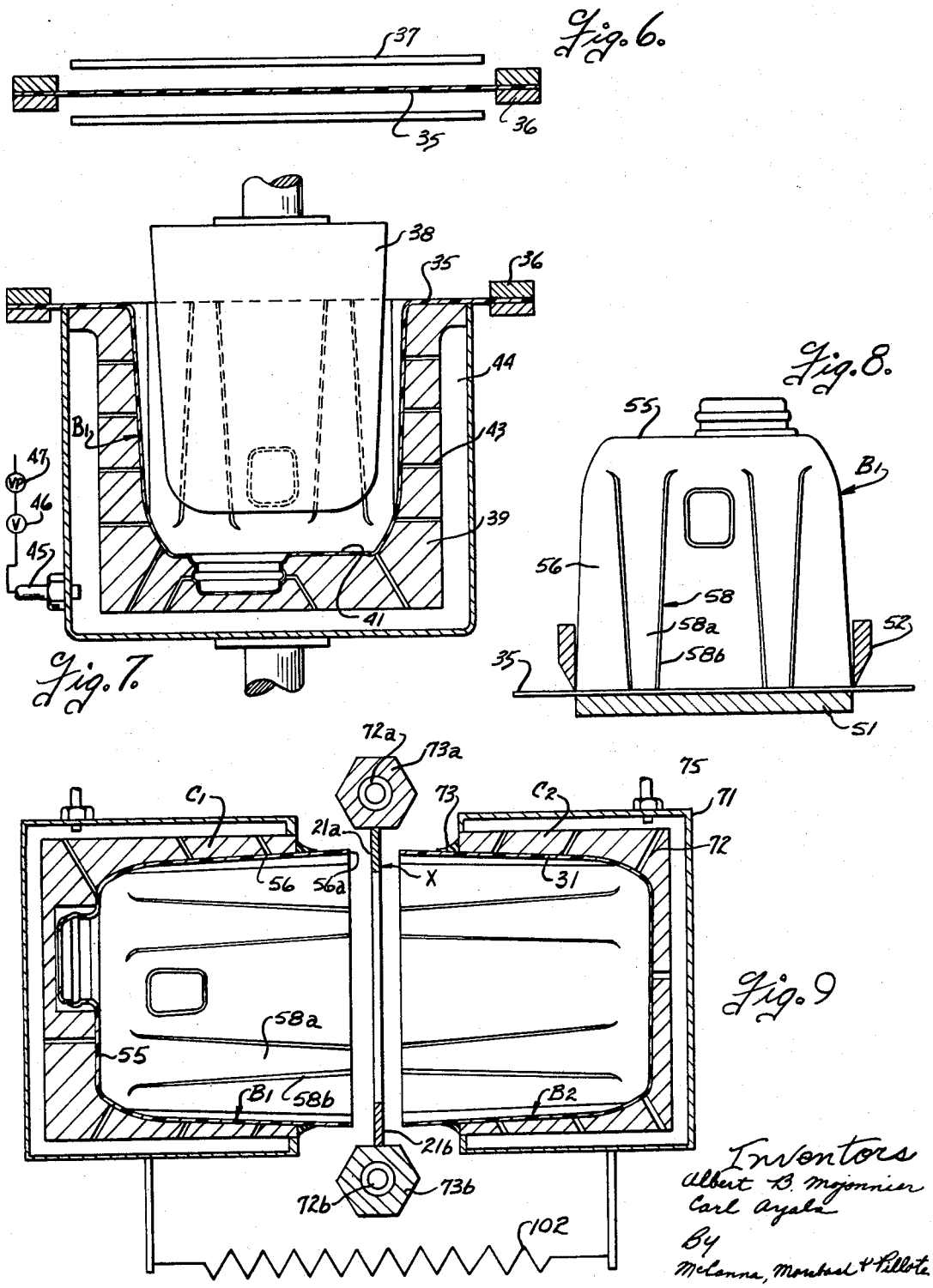

United States Patent Office 3,391,045
Patented July 2, 1968

3,391,045
METHOD FOR JOINING THERMOPLASTIC BODIES
Albert B. Mojonnier, Chicago, and Carl Ayala, Forest Park, Ill., assignors, by mesne assignments to Union Carbide Corporation, New York, N.Y., a corporation of New York
Filed Sept. 9, 1964, Ser. No. 395,235
5 Claims. (Cl. 156—304)

ABSTRACT OF THE DISCLOSURE

A method and apparatus for joining two hollow thermoplastic bodies in which the open ends of the bodies are pressed against a hot blade to soften the ends of the hollow bodies and the softened edges thereafter pressed together to join the two bodies. The bodies are formed with corrugations arranged to permit expansion and contraction of the side walls in a direction lengthwise of the edges, and the bodies are pressed into shape hollow carriers to substantially equalize the size and shape of the sides of the bodies. The blade is preferably heated to a high temperature at which rapid melting and vaporization of the plastic will occur on the blade. The blade is preferably formed in multiple sections and the sections of the blade moved relative to each other laterally outwardly of the hollow bodies after the edges have been heat-softened.

---

This invention relates to heat sealing and particularly to an improved method and apparatus for forming edge-to-edge seals between thermoplastic bodies.

An important object of this invention is to provide a method and apparatus for forming edge-to-edge seals between thermoplastic bodies which provides a strong and durable joint between the bodies.

Another object of this invention is to provide a method and apparatus for forming edge-to-edge seals between thermoplastic bodies which is adapted for heat sealing bodies having very thin walls.

A more particular object of this invention is to provide a method and apparatus for forming edge-to-edge seals between thermoplastic bodies employing a hot blade for heating the edges of the bodies and which avoids accumulation of thermoplastic material on the hot blade and which enables joining of the bodies in a more rapid and facile manner.

A further object of this invention is to provide a method of forming hollow thin walled bodies of thermoplastic material and making edge-to-edge seals therebetween, and which accommodates small dimensional changes in the size and shape of the bodies which occur incident to forming the same.

Yet another object of this invention is to provide an improved hot blade type method and apparatus for forming edge-to-edge seals between thermoplastic bodies wherein the bodies are yieldably urged against opposite sides of a hot blade and the hot blade is then withdrawn whereby the bodies advance into abutting edge-to-edge engagement as soon as the blade is withdrawn to form a butt weld therebetween.

These, together with other objects and advantages of this invention will be more readily appreciated as the invention becomes better understood by reference to the following detailed description when taken in connection with the accompanying drawings wherein:

FIG. 3 is a transverse sectional view taken on the plane 3—3 of FIG. 2;

FIG. 4 is a transverse sectional view taken on the plane 4—4 of FIG. 1;

FIG. 5 is a schematic diagram of suitable electrical and pneumatic controls for the apparatus;

FIG. 6 is a diagrammatic view illustrating the step of heating the thermoplastic sheet prior to thermoforming of the same;

FIG. 7 is a sectional view through a thermoforming mold illustrating the formation of a hollow body;

FIG. 8 is a diagrammatic view illustrating trimming of the hollow body;

FIG. 9 is a fragmentary sectional view through the heat sealing apparatus taken on the plane 9—9 of FIG. 4 illustrating the heat sealing blade and the carriers for the thermoplastic bodies on a larger scale than in FIG. 4;

Figure 1:
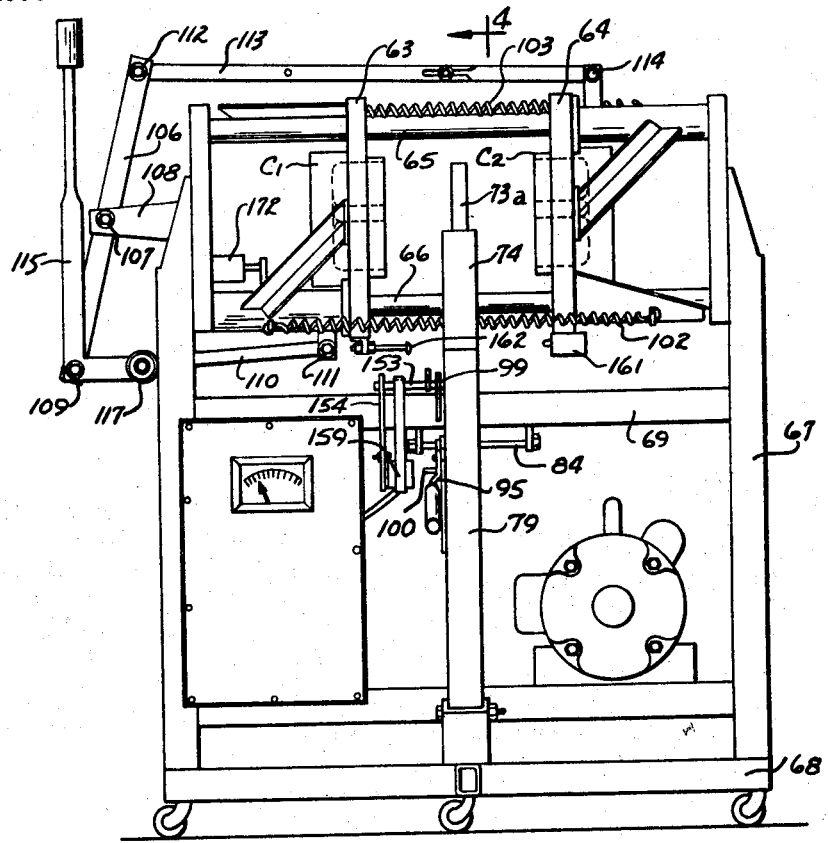
FIG. 1 is a side elevational view of an apparatus for practicing the method of the present invention.

It has heretofore been proposed to join two thermoplastic bodies by pressing the edges of the bodies against a heated member to soften the edges after the softened edges of the bodies are pressed together to join the bodies. In the prior method and apparatus for butt welding thermoplastic bodies with which the applicant is familiar, the heated member was heated to a temperature just sufficient to partially fuse and soften the edge of the thermoplastic material. With such method and apparatus, difficulties were encountered with accumulation of the thermoplastic material on the heated member and various different non-adhering finishes and coverings were employed on the heated member in an attempt to alleviate this problem. The butt welding of thin wall thermoplastic bodies presents particular problems and the prior method and apparatus for butt welding thermoplastic bodies was not suitable for use with thin bodies having a wall thickness of the order of .020 inch or even less.

The present invention is generally adapted for butt welding bodies formed of various different thermoplastic material such as polystyrene, polyethylene, polypropylene, etc. and is adapted for butt welding bodies of widely different wall thicknesses including very thin sections of the order of .010 inch and less to relatively thick wall sections. Moreover, the present invention is adapted for butt welding bodies formed in various different known ways such as molding, extrusion, and sheet forming techniques. It has been found that the relatively thin wall thermoplastic bodies produced by sheet forming techniques present particular problems in butt welding, due to various factors such as differences in wall thickness between successive bodies and even in different areas of the same body, and differences in size and shape of the formed bodies due to differences in shrinkage and variations in the memory effects of the sheet stock from which the articles are formed. The method and apparatus of the present invention is accordingly herein specifically described in connection with butt welding bodies of thermoplastic material which have been formed by sheet forming techniques, it being understood that the present invention is also applicable to butt welding of thermoplastic bodies formed in other different ways.

The butt welding of two thermoplastic articles is diagrammatically shown in FIGS. 11–15. In general, a blade like member designated 21 is heated to a temperature substantially above the compression molding temperature of the thermoplastic material, that is the temperature in which the thermoplastic material becomes sufficiently fluid to enable compression molding. For example, the compression molding temperature for thermoplastic material such as polyethylene, polypropylene and polystyrene is in the range of 300–450° F. The blade temperature is maintained substantially above this compression molding temperature so that the plastic contacting the blade at least liquifies and, preferably, the blade temperature is maintained at a value at which vaporization of the plastic material from the blade will occur in the time interval between successive cycles, with the maximum permissible temperature being below the flash or ignition point of the plastic material. For example, for material such as high impact polystyrene and high density polyethylene which have a compressive molding temperature in the aforementioned range of 300° F. to 450° F., it has been found that the minimum blade temperature should be about 600° F. In this temperature range, the vaporization of the plastic from the blade progresses at a slow rate and it is necessary to use a substantial time delay between successive heat sealing operations to allow the plastic to vaporize before the next thermoplastic body is advanced against the blade. Somewhat improved and more rapid operation is achieved at a blade temperature of about 700° to 800° F., but with a corresponding increase in smokiness and fumes. At blade temperatures in the range 700–800° F., the plastic vaporizes from the blade in a short time, less than 15 seconds, but some dark stains appear on the blade. These stains sometimes wipe off on succeeding thermoplastic bodies and form dark occlusions which affect appearance of the joint but do not appear to adversely affect the joint strength. However, at temperatures of about 900° F., the dark stains on the blade also disappear and enable forming of clean joints. In order to avoid possible contamination, it is preferable to maintain the blade temperature for bodies used in packaging food stuffs at the lower end of the range, that is about 700° F. while other bodies can be butt welded at a much higher blade temperature, for example up to about 1000° F. The above mentioned temperature ranges are applicable to thermoplastic materials such as the aforementioned polyethylene, polystyrene and polypropylene which have a compression molding temperature in the range 300° to 450° F., it being apparent that the temperature range for the blade may have to be increased or decreased for thermoplastic materials having a compression molding temperature substantially above or below the aforementioned range of 300° to 450° F.

Figure 12:
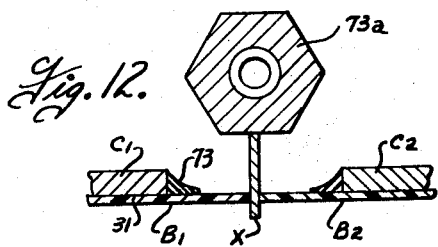
Figure 13:
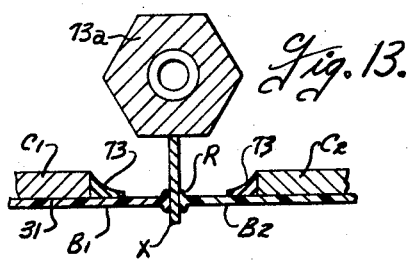
Figure 14:
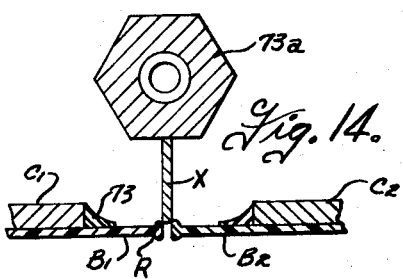
Figure 15:
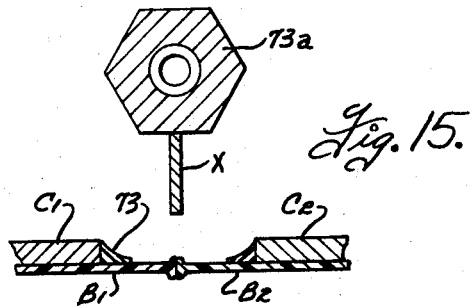

The bodies designated B1 and B2 are supported on carriers C1 and C2 with their edges in approximate alignment, and the bodies are moved edgewise as shown in FIG. 12 into engagement with relatively opposite sides of the blade X. The blade, operated at the elevated temperatures previously described rapidly melts the edges of the body and the advance of the bodies is continued after engagement with the blade for a distance sufficient to allow a ridge of molten material indicated at R to build up at the edges of the bodies, as best shown in FIGS. 13 and 14. Advantageously, the carriers C1 and C2 are yieldably urged toward each other with a pressure just sufficient to feed the bodies against the blade at a rate commensurate with the rate at which the edges of the bodies melt. The blade X is thereafter retracted laterally from between the edges of the bodies, as shown in FIG. 14, and preferably without retracting the bodies away from the blade. The carriers C1 and C2, being yieldably urged toward each other, then move the bodies to bring their edges into abutting engagement as shown in FIG. 15 as soon as the blade is retracted, whereby the melted edges of the bodies fuse and join together. It has been found preferable to maintain the blade X relatively thin and preferably of the order of ⅛ inch, to minimize the travel of the bodies after the blade is retracted. This is advantageous not only to minimize the time in which the edges can cool after retraction of the blade, but also to avoid allowing the bodies to come together with an excessively rapid motion. The latter has been found to produce a deleterious offsetting of the bodies, particularly when very thin wall sections are employed.

In order to butt weld two bodies together, the edges of the bodies must be brought together in approximate alignment. As will be appreciated, when the wall thickness of the bodies is reduced, alignment of the wall sections becomes even more critical. For this purpose, the carriers designated C1 and C2 are formed with cavity 31 arranged to shape and support the bodies B1 and B2 and to align their respective edges with each other. However, minor variations in size and shape of bodies occurs incident to forming of the same, due to differences of shrinkage of the bodies and different parts of the bodies in cooling, and also due to differences in the "memory effects" of the material from which the bodies are formed. It has been found that with hollow bodies having thin side walls, even a small difference between the size of the body and the cavity 31 in the carrier can cause a bowing or dishing of the sidewall of one body relative to the sidewalls of the body on the other carrier sufficient to prevent mating of the thin edges of the bodies. In accordance with the present invention, the sidewalls of the bodies are formed so as to permit limited expansion and contraction of the sidewalls to conform to the respective carriers so as to thereby substantially equalize the size and shape of the bodies while they are supported on their respective carriers.

Reference is now made more specifically to FIGS. 6–8 illustrating formation of one of the bodie B1 by a sheet forming technique, it being understood that the other of the bodies B2 can be formed in a similar manner. As shown in FIG. 6, the sheet designated 35 of thermoplastic material is conveniently supported as by clamp plates 36 and is heated by one or more heating units 37 to soften the same sufficient to permit forming of the sheet to the desired shape. FIG. 7 illustrates forming of the body by the so-called plug assist method of sheet forming and which includes a plug 38 which is movable to form a cup-like draw in the sheet. The plug pushes the heat softened sheet into a mold 39 having a cavity 41 of the desired shape. Fluid pressure is then applied to the sheet to press the same off the mold into the molded cavity and as shown, the mold 39 is provided with passages 43 which communicate with the vacuum chamber 44 surrounding the mold. The latter is connected to a conduit 45 and valve 46 to a vacuum pump 47. The valve is selectively operable to connect the vacuum pump to the mold cavity to draw the sheet against the mold, and to release the vacuum after the sheet has hardened to facilitate removal of the body from the mold cavity. The body is then trimmed from the remainder of the sheet 35, as by cooperating punch and die members 51 and 52 shown in FIG. 8.

Figure 10:
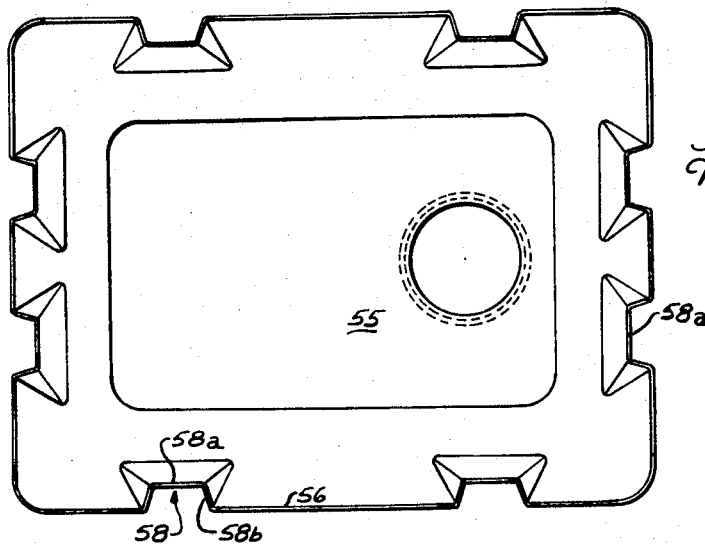
FIG. 10 is an end view of a thermoplastic body after forming of the same.
Figure 11:
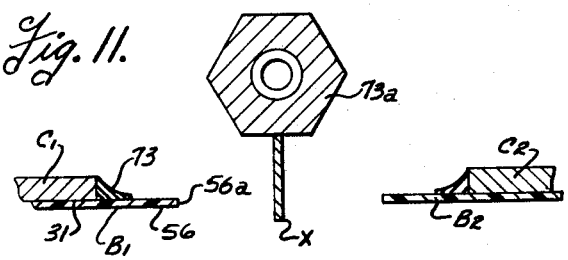
FIGS. 11–15 are diagrammatic views illustrating the sequential steps in heating the edges of the hollow bodies and joining the same.

As shown, the hollow body B1 has an end wall 55 and sidewalls 56, herein shown having a rectangular configuration. The sidewalls 56 terminate in an edge 56a at the open end of the containers, which edge is to be butt welded to a similar body in the manner previously described. In order to permit expansion or contraction of the open side of the bodies to substantially equalize the size and shape of the bodies when they are pressed into the carriers C1 and C2, the sidewalls 56 of the hollow bodies are formed with at least one and preferably several undulations or corrugations which extend in a direction transverse to the edge 56a. As shown in FIG. 10, the undulations or corrugations designated 58 include portions 58a which are offset from the normal surface of the sidewalls 56 and relatively transversely extending portions 58b. When the hollow bodies are pressed into the cavities in the carriers C1 and C2, the transversely extending portions 58b can flex in a direction lengthwise of the edges 56a to either allow expansion or contraction of the sidewalls in the direction lengthwise of the open edge of the bodies, whereby to permit the bodies to conform to the carrier without causing the sidewalls 56 to dish or bow inwardly or outwardly. The minor shifting in the connecting portions 58b required to permit the necessary expansion or contraction of the open side of the containers is quite small and in practice will not be so great as to cause the portions 58b of one body to miss engagement with the corresponding portion 58b of the other body when the bodies are brought into abutting engagement. In order to minimize the amount of shifting and flexing of the individual portions 58b, it is preferable to use a plurality of the corrugations or undulations at somewhat uniformly spaced points around the container, or, alternatively, to generally uniformly corrugate the containers so that each corrugation only takes up a very small amount of the dimensional mismatch of the container halves.

An apparatus suitable for carrying out the method is best illustrated in FIGS. 1–4 and 9. The carriers C1 and C2 are mounted as by guide members 63 and 64 on rails 65 and 66 for movement toward and away from each other. The rails are supported in any suitable manner on a main support frame which, in the embodiment illustrated, includes end uprights 67 and a base 68, with a lengthwise extending frame member 69 extending between the end upright. The carriers C1 and C2 are conveniently similarly formed and have the aforementioned cavity 31 which is shaped complementary to the respective body to support the same with the open edge 56a of the body extending outwardly of the carrier. The bodies are conveniently pneumatically pressed against the respective carriers to support and shape the bodies. As best shown in FIG. 9, the carriers have a vacuum chamber 71 extending therearound and which communicates through passages 72 in the carriers with the cavity 31. A resilient sealing lip of rubber or the like designated 73 is preferably provided around the open side of the carriers to form a seal with the respective thermoplastic body. When a vacuum is connected to the chamber 71 as through a line 75, the fluid pressure on the inside of the thermoplastic bodies presses the bodies firmly against the walls of the cavity 31 to firmly support and shape the body in conformity with the carriers. As previously discussed, the bellows-like corrugations or undulations 58 in the sidewalls of the bodies allow the open sides of the bodies to expand or contract somewhat to permit the bodies to conform to the carriers without causing the sidewalls to bow inwardly or outwardly.

The heating blade X is mounted for movement into and out from between the adjacent ends of the bodies on the carriers C1 and C2. The blade X is made relatively thin and is advantageously formed in a plurality of coplanar sections which are movable laterally relative to each other. In the embodiment illustrated, the blade X includes two generally L-shaped sections designated 21a and 21b each dimensioned to extend along two adjacent edges 56a of the thermoplastic bodies. The blades have a width measured in a direction crosswise of the bodies sufficient to span the edges 56a and the undulations or corrugations thereon. In order to enable use of relatively thin blades 21a and 21b, the heating elements designated 72a and 72b are mounted in a heat conductive members 73a and 73b disposed outside of the blades and extending therealong. A means such as conventional adjustable thermostats 74 are provided for controlling the energization of the heating elements 72 to maintain the blades at a preadjusted temperature.

The blades 21a and 21b are shaped to form a frame like structure when the blades are in their closed position shown in FIG. 4, and the blades are supported for movement in relatively opposite directions to an open position such as shown in FIG. 3. In the embodiment shown, the blades are mounted on arms 78 and 79 for swinging movement about pivots 80 in a plane disposed substantially perpendicular to the path of movement of the carriers C1 and C2. A means is provided for substantially equalizing movement of the arms in relatively opposite directions. As shown, this means includes a crank lever 83 pivotally mounted on the support frame as by a pin 84 intermediate the ends of the lever. One end of the lever is connected by a link 85 and pivot pins 86 and 87 to one of the arms 78 and the other end of the lever 83 is connected by a link 89 and pivot pins 91 and 92 to the other arm 79. A spring 93 is mounted on the frame and arranged to engage one of the arms such as 79 to yieldably urge the arms to their open position shown in FIG. 3. In the embodiment illustrated, the arms are manually returned to their closed position shown in FIG. 4 and for this purpose, an operating lever 95 is pivotally mounted as by the pin 92 on one of the arms 79, which lever has a lateral extension 96 pivotally connected by a pin 97 to a link 98, the other end of which link is secured to the frame, as by the pivot pin 84. As the lever 95 is raised from the position shown in FIG. 3 to the position shown in FIG. 4, it moves the arm 79 inwardly and the latter operates through the links 89, 83 and 85 to move the other arm 78 inwardly to close the blades 21a and 21b. A latch 99 is mounted on the frame and cooperates with a keeper 100 secured to the lever 95 to releasably hold the arms and blade members 21a and 21b in their closed position.

Figure 2:
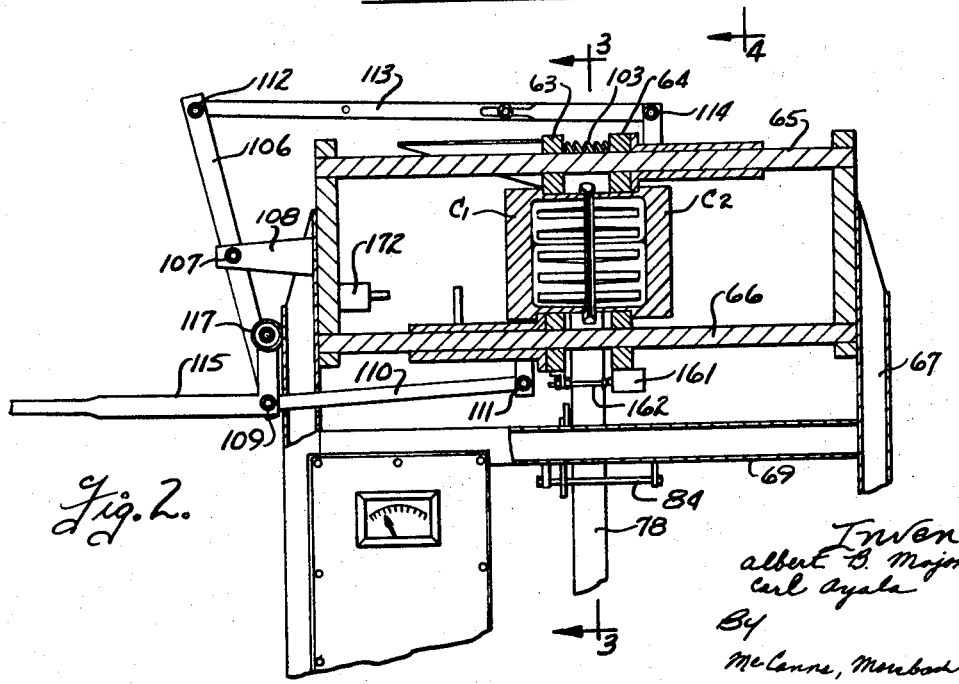
FIG. 2 is a longitudinal sectional view of the apparatus of FIG. 1, and illustrating parts in a moved position.

Apparatus is provided for yieldably urging the carriers C1 and C2 in relatively opposite directions toward opposite sides of the blade X. As shown, the carriers C1 and C2 are yieldably urged toward each other by springs 102 and 103 which are attached to the carrier support members 63 and 64. Apparatus is provided for substantially equalizing movement of the carriers in relatively opposite directions, which apparatus includes a lever 106 pivotally mounted intermediate its ends on a pin 107 attached by a bracket 108 to the support frame. The lower end of the lever 106 is connected by a pivot pin 109 to a link 110, the other end of which link is connected by a pin 111 to one of the carriers C1. The opposite end of the lever 106 is connected by a pivot pin 112 to one end of a preferably longitudinally adjustable link 113, the other end of which link is connected by a pin 114 to the other carrier C2. As will be seen, the lever 106 effects substantially equal and opposite movement of the carriers C1 and C2. In the embodiment shown, the manually operable means is provided for moving the carriers, which means includes a generally L-shaped lever 115 which is pivotally mounted as by the pin 109 to one end of the lever 106. A means such as a roller 117 is provided at one end of the lever 115 and engages the frame to draw the carriers to their retracted position shown in FIG. 1, when the lever 115 is manually moved upwardly. When the lever is moved downwardly as shown in FIG. 2, the springs 102 and 103 operate to yieldably urge the carriers toward each other. As will be seen, the L-shaped lever 115 provides an overcenter device which automatically locks in the raised position when the axis of the roller 117 is moved downwardly to a lever below the pivot pin 109.

A control system for the heat sealing apparatus is diagrammatically shown in FIG. 5. As shown therein, the heating elements designated 72a and 72b for the blades are connected to the power supply conductors 150 and 151 through a main switch 152 and the respective adjustable thermostatically controlled switches 74 operate to maintain the blades at the preadjusted temperature. The latch 99 is secured to a shaft 153 rockably supported in brackets 154, and the latch is yieldably urged toward its keeper engaging position by a spring 156 interposed between the frame member 69 and an arm 155 that extends laterally from the shaft 153. The latch 99 normally holds the arms and blade members in their closed position shown in FIG. 4 and an electro-responsive device such as a solenoid 158 is provided for selectively releasing the latch to allow the spring 93 to rapidly retract the blades from between the thermoplastic bodies. As shown in FIG. 3, the solenoid armature is connected through an arm 159 to the shaft 153 that carries the latch lever 99 to release the latch when the solenoid armature is moved to the left as viewed in FIG. 3. As previously described, the blade X is maintained at a relatively high temperature which rapidly melts the edges of the thermoplastic material and the thin wall thermoplastic bodies are moved into engagement with the opposite sides of the blade. The advance of the bodies against the blade is continued after the edges contact the blade for a distance which for thin walled bodies is preferably at least several times the thickness of the walls of the body to build up the ridge R of the molten material at the edges of the bodies. The blades X are then rapidly moved outwardly from between the bodies, without retracting the bodies away from the blade, and the carriers thereafter move the bodies into abutting engagement as soon as the blade is retracted. In order to assure retraction of the blade at the proper time, a means is preferably provided which responds to the position of the carriers with respect to the blade. As diagrammatically shown in FIG. 5, this includes a switch means designated 161 attached to one of the carriers such as C1 and a switch operator 162 attached to the other carrier C2. The operator 162 is adjusted to engage and actuate the switch 161 only after the carriers have moved the bodies into engagement with the blade and the bodies have advanced a preselected disstance after contacting the blade to build up the aforementioned ridge of material. Advantageously, either the switch 161 or operator 162 is made adjustable to enable adjustment of the carrier position at which the switch 161 is operated.

In the present embodiment, the switch 161 is of the normally open type so that the solenoid 158 is normally deenergized whereby the spring 156 operates to urge the latch in its latched position. When the operator 162 closes the switch 158, the solenoid 158 releases the latch 99 and allows the spring 93 to rapidly move the arms 78, 79 and the heat sealing blades 21a and 21b to their retracted position.

As previously described, the bodies are conveniently supported and pressed into the carriers by fluid pressure. As diagrammatically shown in FIG. 5, a motor 165 is connected through conductor 166 to the power supply, and which motor drives a vacuum pump 167. The vacuum pump is connected through lines 169 and 170 to the vacuum chambers 71 on the respective carriers. A means is preferably provided for releasing the vacuum when the carriers are moved apart as shown in FIG. 1. For this purpose, a vacuum relief valve 172 is connected through a vacuum release line 174 to the vacuum line 169 and has a movable valve member 173 positioned to operate by one of the carriers C1, when the latter is retracted, to thereby open the valve in the vacuum release line 174 and vent the same to atmosphere. This reduces the vacuum applied to the carriers C1 and C2 and facilitates removal and insertion of the bodies from the carriers. Alternatively, any other suitable mechanism may be provided for controlling the application of vacuum to the carriers.

From the foregoing, it is thought that the practice of the method and construction and operation of the heat sealing device will be readily understood. The thermoplastic bodies are preformed to the desired shape and, in thin walled thermoplastic bodies, the sidewalls are advantageously formed with undulations or corrugations which provide a bellows like structure which enables expansion and contraction of the open end of the hollow bodies. When these bodies are pressed into the carriers C1 and C2, the bodies can expand or contract as required to conform to the carriers, and thereby substantially equalize the size and the shape of the open ends of the carriers.

The hot blades X are heated to a temperature substantially above the temperature at which the thermoplastic material becomes a flowable liquid and the blades rapidly heat and melt the edges of the thermoplastic bodies as they are moved against opposite sides of the blades. The bodies are advanced some distance after contacting the blade to build up a molten ridge R of material at the edges of the bodies and the blades are then rapidly retracted laterally from between the bodies and the bodies thereafter press together to fuse and join the same. The high temperature blade is advantageous in that it not only speeds up the heat sealing operation, but also avoids accumulation or buildup of theromplastic material on the blade. Any material which contacts the blade is rapidly melted and either runs off or is vaporized from the blade. The high temperature blade also prevents the thermoplastic bodies from sticking to the blade so that the blade can be withdrawn laterally from between the bodies, without first retracting the bodies away from the blade. This, in turn, minimizes the time delay between softening of the edges of the bodies and pressing of the edges together, to provide an improved seal. Moreover, the blades are made relatively thin, as best shown in FIG. 9, so that the travel of the bodies after the blades are withdrawn are minimized.

We claim:

1. The method of joining two hollow bodies each formed of thin thermoplastic material and having a peripheral side wall terminating in an edge at the open side of the body comprising, preforming the side walls of the two bodies with complementary undulations extending transverse to the edges at the open sides of the bodies to permit expansion and contraction of the side walls in a direction lengthwise of said edges of the bodies, substantially equalizing the shape and size of the open sides of the two bodies by pressing the bodies into shaped hollow carriers with the edge portions of the bodies extending out of the carriers, moving the bodies with the carriers to bring said edges of the bodies into engagement with a heated member to soften the edges, and thereafter pressing the softened edges of the bodies together to join the two bodies.

2. The method of joining two hollow bodies each formed of thin thermoplastic material and having a peripheral side wall terminating in an edge at the open side of the body comprising, preforming the side walls of the two bodies with complementary undulations extending transverse to the edges at the open sides of the bodies to permit expansion and contraction of the side walls in a direction lengthwise of said edges of the bodies, substantially equalizing the shape and size of the open sides of the two bodies by pressing the bodies into shaped hollow carriers with the edge portion of the bodies extending out of the carriers, heating a thin blade to a temperature substantially above the temperature at which the thermoplastic material becomes liquid, advancing the two bodies to bring their edges against opposite sides of the blade and in approximate alignment with each other to melt the edges of the bodies, and moving the blade laterally out from between the bodies without retracting the bodies away from the blade, and bringing the edges of the sections into contact to fuse the sections together.

3. The method of joining two hollow bodies each formed of thin thermoplastic material and having a peripheral side wall terminating in an edge at the open side of the body comprising, preforming the side walls of the two bodies with complementary undulations extending transverse to the edges at the open sides of the bodies to permit expansion and contraction of the side walls in a direction lengthwise of said edges of the bodies, substantially equalizing the shape and size of the open sides of the two bodies by pressing the bodies into shaped hollow carriers with the edge portions of the bodies extending out of the carriers, yieldably urging the two bodies toward each other with their open sides facing each other and in approximate alignment against opposite sides of the blade to melt the edges of the bodies and moving the blade laterally out from between the bodies while continuing to yieldably urge the bodies toward each other to cause the melted edges of the bodies to move into contact with each other as soon as the blade is retracted.

4. The method of claim 2 wherein the blade is heated to a temperature above the temperature at which rapid vaporization of the thermoplastic material on the blade will occur.

5. The method of joining two bodies each formed of thin thermoplastic material and having a peripheral side wall terminating in an edge at the open side of the body comprising, preforming the side walls of the two bodies with at least one bellows-like corrugation extending transverse to the edges of the bodies to permit expansion and contraction of the side walls in a direction lengthwise of said edges, substantially equalizing the size and shape of the open sides of the bodies by conforming the bodies to shape hollow carriers, heating the edges of the bodies, and moving the bodies together with their edges in substantial alignment and the corrugations in substantial registry to fuse the bodies together.

References Cited

UNITED STATES PATENTS

| | | | |
|---|---|---|---|
| 2,379,500 | 7/1945 | Steffens | 156—304 |
| 2,384,014 | 9/1945 | Cutter | 156—499 |
| 2,438,685 | 3/1948 | Stevens | 156—304 |
| 2,505,647 | 7/1950 | Norris | 156—304 |
| 3,013,925 | 12/1961 | Larsen | 156—304 |

DOUGLAS J. DRUMMOND, *Primary Examiner.*